United States Patent [19]

Bengl et al.

[11] Patent Number: 4,698,085
[45] Date of Patent: Oct. 6, 1987

[54] APPARATUS FOR PRODUCING MINERAL FIBRES FROM SILICATE RAW MATERIALS SUCH AS BASALT, IN PARTICULAR BY BLAST DRAWING

[75] Inventors: Dieter Bengl, Mutterstadt; Johannes Horres, Ladenburg, both of Fed. Rep. of Germany

[73] Assignee: Grunzweig & Hartmann und Glasfaser AG, Fed. Rep. of Germany

[21] Appl. No.: 839,226

[22] Filed: Mar. 13, 1986

[30] Foreign Application Priority Data

Mar. 15, 1985 [DE] Fed. Rep. of Germany ....... 3509425

[51] Int. Cl.⁴ .............................................. C03B 37/06
[52] U.S. Cl. ......................................... 65/16; 65/3.43; 65/9; 65/12; 65/27; 65/356; 156/62.4
[58] Field of Search .................... 65/4.4, 9, 7, 16, 11.1, 65/12, 3.43, 356, 27; 156/62.4

[56] References Cited

U.S. PATENT DOCUMENTS

| | | | |
|---|---|---|---|
| 2,189,840 | 2/1940 | Simison et al. | 65/7 X |
| 2,494,999 | 1/1950 | Halkins | 65/9 |
| 2,978,743 | 4/1961 | Osborne | 65/16 X |
| 3,801,243 | 4/1974 | Smith et al. | 65/9 |
| 4,594,086 | 6/1986 | Mosnier | 65/4.4 |

Primary Examiner—Robert L. Lindsay
Attorney, Agent, or Firm—Finnegan, Henderson, Farabow, Garrett & Dunner

[57] ABSTRACT

In the production of bonded mineral fibre wool, binder is injected in the chute (16) onto the fibres, as a result of which there is a tendency for the fibres to adhere to the walls of the chute (16) and to form encrustations due to binder becoming cured in the course of time. To avoid such encrustations, which can cause production shortfalls, the circumferential walls (18, 20) of the chute are constructed as jacketed walls and are cooled by passing cooling liquid in the hollow space (30) between the inner and outer surface portions (28, 29). It has been found, surprisingly, that as a result no solid encrustations can form even over prolonged periods, since temporarily adhering fibres cannot in fact become adhesively bonded due to insufficient curing of the binder at the low temperatures, but are continuously removed from the wall again. In contrast to the permanent cleaning of the chute walls, for example in the form of rotary walls, not only is the considerable expenditure in terms of investment and maintenance and/or unforeseeable plant shutdowns avoided, but also there is obtained dimensionally accurate sealing of the circumferential walls (18, 20) of the chute (16), so that there is no occurrence of fibre losses or attraction of unwanted air.

4 Claims, 2 Drawing Figures

APPARATUS FOR PRODUCING MINERAL FIBRES FROM SILICATE RAW MATERIALS SUCH AS BASALT, IN PARTICULAR BY BLAST DRAWING

BACKGROUND OF THE INVENTION

The invention relates to an apparatus for producing mineral fibres from silicate raw materials such as basalt, in particular by blast drawing.

When blast drawing is used to produce mineral fibres, the mineral fibres emerging from the fiberisation unit in the form of a blast nozzle unit pass into a chute, along the length of which the jet of flow medium which carries the fibres has the opportunity to fan out, so that the fibres fill out the cross-section of the chute in substantially homogeneous manner and thus can be laid onto a conveyor belt to form a mineral fibre web. In the entry zone of the chute, fluid binder such as phenolic resin is sprayed in and adheres to the fibres and descends thereon onto the conveyor belt. In the course of their descent, fibres which are at the edge come into contact with the circumferential walls of the chute, in particular in the lower section of the chute, so that the binder adhering to the fibres can have the effect of causing the fibers to adhere to the walls of the chute. As a consequence of the relatively high temperature in the chute, which is continuously supplied by the fiberisation units with fibres of comparatively high temperature, the result can be that the binder becomes cured on the chute walls and can form encrustations which are afterwards very difficult to remove.

To avoid that it is known to construct at least the side walls of the chute to be movable over a major area, namely as so-called rotary walls, in such a way that the side walls basically constitute upright conveyor tracks whose conveyor belt is in constant motion. The adhering fibres are thus transported with the conveyor belt out of the zone of the chute interior, where the surface of the belt is cleaned and can be guided back into the chute interior on the other side.

In this way it is perfectly possible to remove a large portion of the adhering fibres in a continuous manner in a continuous operation and thus to avoid larger and more stable encrustations.

This known procedure, which corresponds to the conventional technology in the field, however, is extremely costly, not only in terms of investment costs but also in terms of maintenance costs. The drives for the rotary walls are subject to marked contamination and therefore tend to break down. If the unit is stationary for refitting or repair work or the like, no cleaning takes place although it is nonetheless possible for encrustations which are difficult to remove to be formed. Residues which escape the cleaning device, in particular in the interior of the rotary walls, likewise form a virtually unremovable deposit of dirt. When encrustations are in the process of formation or have formed and are subsequently rubbed off, for example through an adjustment of the cross-section of the chute, they end up on the production belt where they cause production errors and interferences within the area of the discharge from the chute.

If merely the large-area side walls and not the front walls of the chute are equipped with such rotary walls, corresponding encrustations on the front walls are unavoidable, and these encrustations can grow to a considerable size until they for example drop off through their own weight and in this way cause production problems.

It has also been found to be a severe problem that it is virtually impossible to produce a dimensionally truly accurate seal between the rotary walls and rigid walls and especially between rotary walls which may be adjacent. As a result, a considerable amount of unwanted air passes into the chute and needs to be evacuated underneath the conveyor belt together with the wanted secondary air sucked in by way of the chute. There are also appreciable fibre losses due to the egress of fibre through leaks in the chute, which need to be added to the fibre lost due to encrustations and the like.

SUMMARY OF THE INVENTION

It is the object of the invention to provide an apparatus for forming fibermat from silicate materials formed into fibers by blast drawing and with which it is possible to avoid production problems and production losses in the area of the chute.

This object is achieved by means of a melt tank having at least one distributor tank for receiving melt therefrom with the distributor tank having at least one exit orifice therein for expressing primary filaments from the orifice. A blast nozzle unit for performing the primary filaments is arranged beneath the exit orifice at a distance therefrom a symmetrical to a line of flight of the primary filaments. A vertical chute is arranged beneath the blast nozzle unit for receiving a flow bundle of fibers therefrom. The chute has an upper entry zone and vertically extending circumferential walls comprising a pair of spaced apart front walls and a pair of spaced apart side walls. Each of the walls are constructed of a rigid material having a hollow space extending along the vertical length thereof and connections for circulating a cooling liquid therein. Spray means are arranged at the entry zone of the chute for spraying fluid binder into the flow bundle. A conveyor belt is arranged beneath the lower end of the chute on which the fibers emerging from the chute are laid and transported in the way of a continuous web.

It has been found, surprisingly, that all that is needed to avoid encrustations to a marked degree is sufficient cooling of the walls of the chute. cold chute walls offer the binder no site for solidification, leaving it as a fluid. On the other hand, in view of the relatively low amount of applied binder, fluid binder cannot retain fibres on the wall to any marked degree. The turbulent flow in the chute is thus sufficient to reliberate from the wall those fibres which come into contact with the wall, so that the result is so to spead a self-cleaning effect. It is consequently possible to apply dimensionally accurate sealing to all the circumferential walls of the chute, so that fibre loss due to encrustations or leaks is impossible and the unwanted air is reduced to a minimum. This simple method of sealing correspondingly also applies of course to the sealing in the area of the conveyor belt, so that the end result is a mat of fibres which has exactly rectangular corners and excellent widthwise distribution.

Thorough cooling with the lowest possible wall temperature for a given coolant temperature results when the chute is subdivided into a plurality of chute sections which are arranged on top of one another and which each have their own cooling liquid cycle.

Furthermore, it is specifically the rigid arrangement of the circumferential walls which is specified in the invention which favours a use of movable walls as is claimed in claim 3, which are of importance for the formation of a desired fibre web in particular in the area of the lower chute section.

BRIEF DESCRIPTION OF THE DRAWINGS

Further details, features and advantages of the invention are revealed in the following description of an embodiment by reference to the drawing, in which.

DESCRIPTION OF THE PREFERRED EMBODIMENTS

Figure 2:
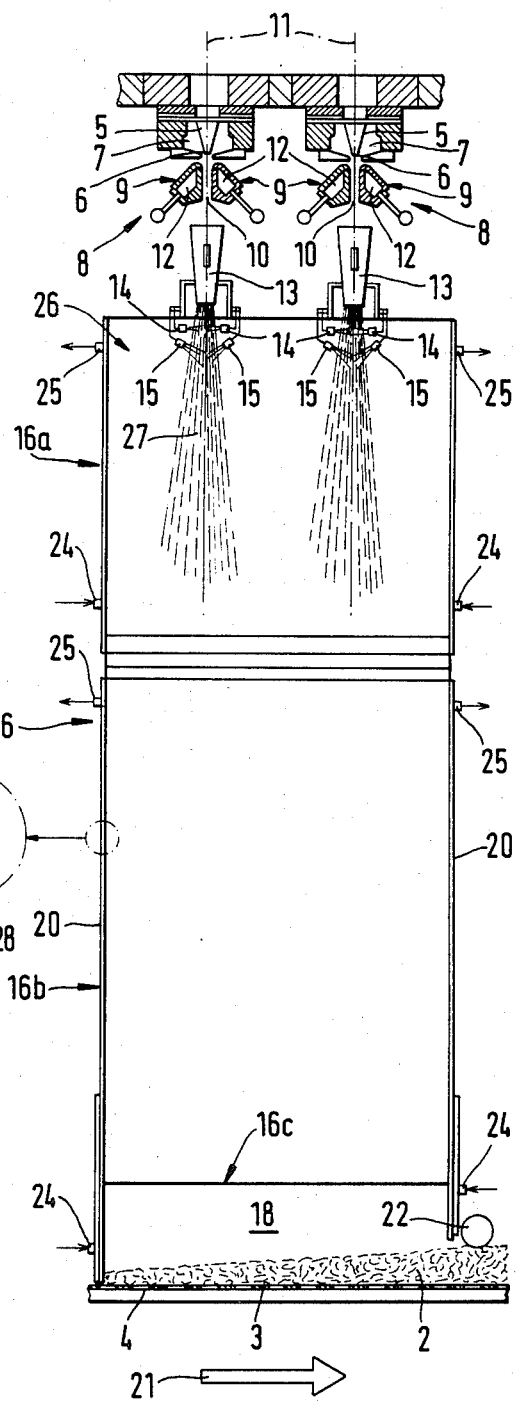

As the drawing shows, an apparatus according to the invention serves for converting a mineral melt, signified by 1, in the top part of the apparatus into mineral fibres which are deposited onto a conveyor belt 3 for the formation of a continuous mineral fibre web 2 which is transported away, in the drawing of FIG. 2 towards the right-hand side. As indicated in FIG. 2, the conveyor belt 3 has perforations 4 through which air or gas can be sucked downward as is customary per se in the production of mineral fibres, in an unspecified manner.

The melt 1 from a melt tank (not depicted) is fed for example to two distributor tanks 5 which are arranged side by side and which each have a number of outlet orifices 6 for melt. The distributor tanks 5 are made of platinum in conventional and known manner and are maintained at a desired temperature by means of flames in lateral hollow spaces 7.

As is in principle likewise customary with blast drawing, there are arranged beneath the exit orifices 6 blast nozzle means 8 which each consist of two blast nozzle halves 9 and, arranged therebetween, a nozzle slot 10 through which primary filaments of melt emerging from the exit orifices 6 appear in correspondence with the plumb lines 11 shown in FIG. 2 which indicate the line of flight of the primary filaments. In the blast nozzle, the primary filaments are simultaneously fiberised, or broken into fibres, by means of propellant gas which is provided under superatmospheric pressure in hollow spaces 12 of the blast nozzle halves and is blown into the nozzle slot 10 by way of blow-in slits not visible in the drawing. The basic processes which take place in this process of fibersation are familiar to the person skilled in the art.

The - as drawn - lower exit side of the blast nozzle means 8 sees the emergence of a diverging flow bundle which contains the propellant gas; secondary air attracted from the upper side of the blast nozzle unit 8 by the injector action of the blow-in propellant gas; together with combustion off-gases from the hollow spaces 7 and the freshly formed fibres at still high temperatures. The flow bundle arrives in guide cells 13 which are convergent in nozzlelike fashion, as a result of which further secondary air is attracted once more on their upper side for further cooling, and the resulting fibre-gas mixture emerges from the exit of the guide cells 13 with renewed bundling into a divergent flow bundle 27 again. Owing to the elongated shape of the nozzle slots 10 and guide cells 13, the flow bundles are naturally of a corresponding elongated shape and merely act as slender circular cones in a view corresponding to FIG. 2. In the region of the lower end of the guide cells 13 there are spray nozzles 14 for injecting cooling liquid such as cooling water and spray nozzles 15 for injecting binder such as phenolic resin in fluent consistency.

That is also the entry zone of a chute which is signified as a whole by 16 and which has, arranged on top of one another, a first chute section 16a, a second chute section 16b and a third chute section 16c. In the interior of the chute 16 the descending fibres cool down further and become distributed across the cross-section of the chute, so that the result is uniform deposition as a web 2 on conveyor belt 3, and the entrained gases carried over into the chute 16 are evacuated away in the known manner already indicated above.

Figure 1:
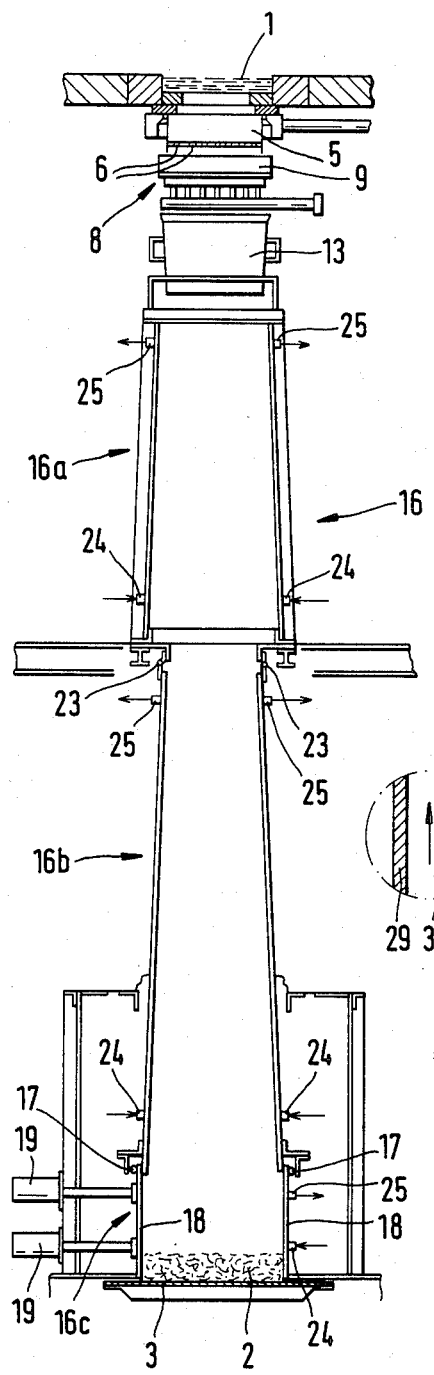
FIG. 1 shows an apparatus according to the invention in a schematic front view and FIG. 2 shows the apparatus of FIG. 1 in a side view.

The lower chute section 16c of chute 16 has movable side walls 18 which are for example adjustable in their position through parallel shifting by way of adjusting members 19 and are connected to the adjoining walls of the middle chute section 16b by means of catches 17 and, as is clear from FIG. 1, bound the side edges of the web. As is clear in the drawing from the cut-away representation of the area of the chute 16, the front walls 20 of the middle chute section 16b extend into the area of the lower chute section 16c and thus also form the front walls of that section as well. The front walls 20 of the entire chute 16 are arranged to be rigid, and the front wall which is to the rear in relation to arrow 21 which indicates the transport direction is correspondingly shorter to accommodate the height of the mineral fibre web 2, so that the mineral fibre web 2 can emerge from the area of the chute 16, and during emergence is simultaneously subject to the application of pressure and height levelling by a likewise cooled roll 22.

It is true that in this way some of the circumferential walls of the chute 16 are movable, like for example the side walls 18 of the lowest chute section 16c through parallel shifting and if required likewise the side walls of the middle chute section 16b through pivoting movement about hinges 23, but all the circumferential walls as such are constructed to be rigid, that is to say have no possible movement for continuous self-cleaning or the like. On the other hand, however, all the circumferential walls of the chute 16 are constructed to be jacketed, the resulting hollow spaces being filled with cooling liquid which in each case is suppliable through connections 24 and dischargeable through connections 25.

The fibres are blown into the upper entry zone 26 of the chute 16, i.e. the uppermost chute section 16a, in flow bundles 27 and are simultaneously treated with a fluid binder such as phenolic resin emerging from the spray nozzles 15. The measures described before the application of the binder have the effect that the fibres are already sufficiently cold at this point, even if thick fibres within the range from 10 μm or more are produced, so as not to cause immediate curing of the binder. For further particulars in this respect express reference is made to the parallel German patent application of the same applicant and of today's date entitled "Apparatus for producing mineral fibres from silicate raw materials such as basalt by blast drawing" under patent agent folio No. 11 GH04 41.

The binder adhering to the fibres arrives thereon on the conveyor belt 3 while cooling down further and is transported out of the area of the chute 16 and cooled down further there before intentional curing takes place by heat supply in a tunnel furnace. However, if fibres come into contact with the circumferential walls 18, 20 of the chute 16, there is a danger that the fibre will stick and remain there, so that, before cooling down further, the binder has opportunity for developing binding forces and establishing a final bond between the fibre and the wall, which can lead to the encrustations described at the beginning. It has been found, surprisingly, that if circumferential chute walls 18, 20 are thoroughly cooled by liquid, that is to say down to for example room temperature or still lower, this tendency for the binder to become solid is completely obviated at least in the area of contact with the wall, so that the fibres are released from the wall by subsequently impacting fibres, turbulent air flows and the like and can be guided to the conveyor belt 3.

As is illustrated in the depicted magnification, the circumferential walls 18, 20 consist for this purpose of inner surface portions 28 and outer surface portions 29, which form the jacketed wall and between which there is left a hollow space 30 for the circulation of cooling liquid such as cooling water. Viewed from the outside, the circumferential wall 18 or 20 is merely a somewhat thicker metal wall which, however, as a rigid wall can be easily spliced to be leakproof, so that fibre losses due to leaks, the sucking-in of unwanted air and so on are reliably avoided. Even in the case of permanently adhering fibres, the binder is not cured, so that these fibres can be simply sprayed away with cleaning fluid from time to time, for example every few days, and thereafter the circumferential walls 18, 20 of the chute 16 are again present in a completely clean state. Production problems due to cured encrustations dropping off or the like are completely ruled out.

As a result of the fact that permanent encrustations or the like are avoided, there is also greater freedom in respect of the permissible movement of for example the side walls 18 of the lower chute section 16c into the path of the descending fibres, that is to say into a position in which, without thorough cooling, virtually immediate growth of encrustations would be assured, since the cleaning effect of the force of gravity is practically ruled out. It has been found that in the case of chute walls which are cooled in accordance with the invention no deposits of troublesome thickness can arise even in inclined positions which are suitable for the formation of fibre deposits.

We claim:

1. Apparatus for producing mineral fibres from silicate raw materials by blast drawing comprising:
   (a) a melt tank;
   (b) at least one distributor tank for receiving melt from said melt tank and having at least one exit orifice therein for expressing primary filaments of melt therefrom;
   (c) a blast nozzle unit for fiberising said primary filaments arranged beneath said exit orifice at a distance therefrom and symmetrical to the line of flight of said primary filaments;
   (d) a vertical chute arranged beneath said blast nozzle unit for receiving a flow bundle of fibres therefrom, said chute having an upper entry zone and vertically extending circumferential walls comprising a pair of spaced-apart front walls and a pair of spaced-apart side walls, each of said walls being constructed of a rigid material, having a hollow space extending along the vertical length thereof and connections for circulating a cooling liquid therein;
   (e) spray means arranged in said entry zone of said chute for spraying fluid binder into said flow bundle; and
   (f) a conveyor belt arranged beneath the lower end of said chute and on which fibres emerging from said chute are laid and transported away in the form of a continuous web.

2. The apparatus of claim 1 wherein said chute comprises a plurality of chute sections arranged vertically adjacent to and connected to each other, each of said sections having its own cooling liquid connections.

3. The apparatus of claim 2 wherein at least said side walls of the lowermost of said chute sections are laterally movable across said conveyor belt.

4. The apparatus of claim 3 wherein said lowermost side walls include means for shifting said side walls parallel to one another.

* * * * *